United States Patent
Yamashita et al.

(10) Patent No.: US 9,794,255 B2
(45) Date of Patent: Oct. 17, 2017

(54) COMMUNICATION TERMINAL AND COMMUNICATION PROCESSING METHOD

(71) Applicant: FUJITSU LIMITED, Kawasaki-shi, Kanagawa (JP)

(72) Inventors: Daisuke Yamashita, Kawasaki (JP); Masahide Noda, Kawasaki (JP); Junichi Yura, Yokohama (JP); Hideto Kihara, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 76 days.

(21) Appl. No.: 14/504,524

(22) Filed: Oct. 2, 2014

(65) Prior Publication Data

US 2015/0106904 A1    Apr. 16, 2015

(30) Foreign Application Priority Data

Oct. 10, 2013  (JP) .................. 2013-212851

(51) Int. Cl.
  *H04L 29/06* (2006.01)
  *H04W 12/06* (2009.01)
  *G06F 21/44* (2013.01)

(52) U.S. Cl.
  CPC .......... *H04L 63/0884* (2013.01); *H04L 63/08* (2013.01); *H04L 63/0815* (2013.01); *H04L 63/101* (2013.01); *H04W 12/06* (2013.01); *G06F 21/44* (2013.01)

(58) Field of Classification Search
  None
  See application file for complete search history.

(56) References Cited

U.S. PATENT DOCUMENTS

| 5,875,296 | A | 2/1999 | Shi et al. | |
|---|---|---|---|---|
| 6,438,600 | B1 * | 8/2002 | Greenfield | H04L 63/0815 709/228 |
| 7,469,271 | B2 * | 12/2008 | Shimada | H04L 12/5895 707/999.01 |

(Continued)

FOREIGN PATENT DOCUMENTS

| JP | 2-19942 | 1/1990 |
|---|---|---|
| JP | 10-257048 | 9/1998 |

(Continued)

OTHER PUBLICATIONS

Extended European search report dated Mar. 16, 2015 in European Patent Application No. 14187137.6.

(Continued)

*Primary Examiner* — Malcolm Cribbs
(74) *Attorney, Agent, or Firm* — Staas & Halsey LLP

(57) ABSTRACT

A processor stores authentication information managed by a native environment of the communication terminal in a first storage region of the storage device. The processor stores authentication information of an application to be executed on a Web application execution environment of the communication terminal in a second storage region of the storage device. The processor performs a control to write the authentication information stored in the first storage region to the second storage region when authentication information used by the application is not stored in the second storage region and is stored in the first storage region.

8 Claims, 12 Drawing Sheets

(56) References Cited

U.S. PATENT DOCUMENTS

| | | | | |
|---|---|---|---|---|
| 7,500,262 | B1* | 3/2009 | Sanin | G06F 21/41 705/67 |
| 7,530,094 | B2* | 5/2009 | Philips | G06F 21/41 726/2 |
| 8,839,414 | B2* | 9/2014 | Mantle | G06F 21/6218 726/19 |
| 2002/0178375 | A1* | 11/2002 | Whittaker | G06F 21/554 726/22 |
| 2005/0135626 | A1* | 6/2005 | Ball | H04L 9/0894 380/277 |
| 2006/0236129 | A1* | 10/2006 | Mimatsu | G06F 21/805 713/193 |
| 2008/0155662 | A1 | 6/2008 | Vykunta | |
| 2008/0283595 | A1* | 11/2008 | Kimura | G06F 21/62 235/380 |
| 2009/0007250 | A1* | 1/2009 | Pouzin | G06F 21/335 726/10 |
| 2009/0199270 | A1 | 8/2009 | Ogita | |
| 2010/0257578 | A1 | 10/2010 | Shukla et al. | |
| 2011/0055560 | A1* | 3/2011 | Meissner | G06F 21/602 713/166 |
| 2011/0093937 | A1* | 4/2011 | Mantle | G06F 21/6218 726/6 |
| 2011/0202985 | A1* | 8/2011 | Kamakura | G06F 21/32 726/7 |
| 2011/0202989 | A1* | 8/2011 | Otranen | H04L 63/0815 726/8 |
| 2012/0047499 | A1* | 2/2012 | Krzystofczyk | G06F 8/63 717/174 |
| 2012/0297187 | A1* | 11/2012 | Paya | H04L 63/0492 713/156 |
| 2013/0077125 | A1 | 3/2013 | Kitagata | |
| 2013/0156196 | A1* | 6/2013 | Jogand-Coulomb | G06F 21/10 380/278 |
| 2013/0160115 | A1* | 6/2013 | Venkataramanappa | G06F 11/3409 726/22 |
| 2013/0254519 | A1* | 9/2013 | Benoit | H04W 12/04 713/1 |
| 2014/0075513 | A1* | 3/2014 | Trammel | H04L 9/3213 726/4 |
| 2014/0096213 | A1* | 4/2014 | Quan | H04W 12/06 726/7 |
| 2014/0108793 | A1* | 4/2014 | Barton | G06F 21/6218 713/165 |
| 2014/0109200 | A1* | 4/2014 | Tootill | G06F 21/32 726/5 |
| 2014/0244584 | A1* | 8/2014 | Song | G06F 17/30345 707/627 |
| 2014/0250511 | A1* | 9/2014 | Kendall | H04L 63/0815 726/6 |
| 2014/0259167 | A1* | 9/2014 | Babu | G06F 21/554 726/23 |
| 2014/0331273 | A1* | 11/2014 | Koneru | H04L 63/20 726/1 |

FOREIGN PATENT DOCUMENTS

| | | |
|---|---|---|
| JP | 2006-215988 | 8/2006 |
| JP | 2009-188446 | 8/2009 |
| JP | 2013-73314 | 4/2013 |

OTHER PUBLICATIONS

Japanese Office Action dated Jun. 20, 2017 in corresponding Japanese Patent Application No. 2013-212851.

* cited by examiner

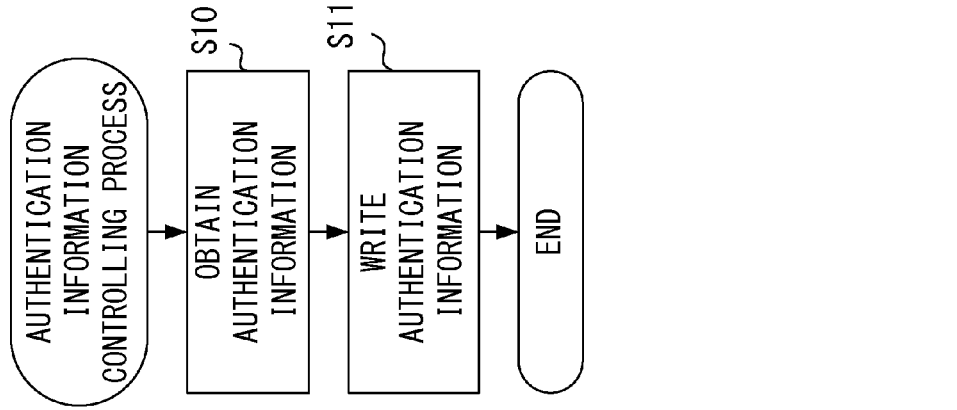
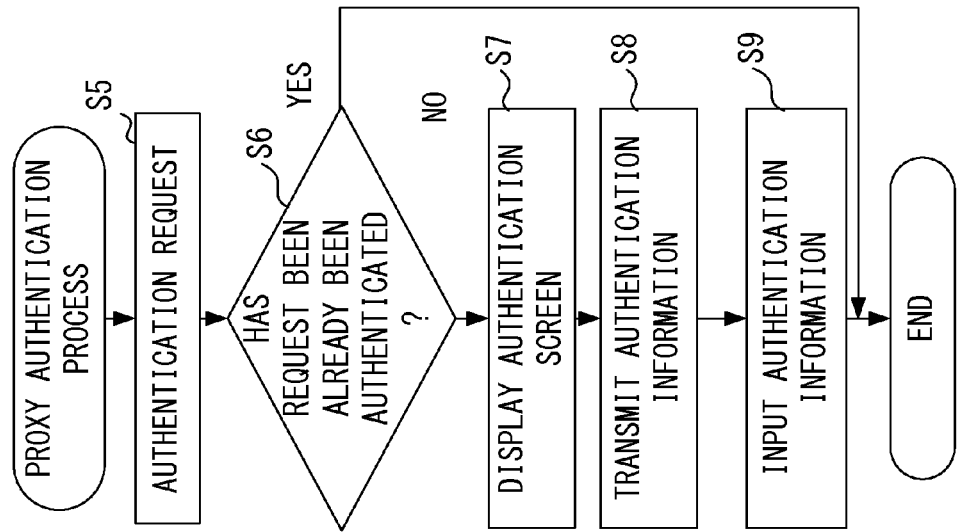
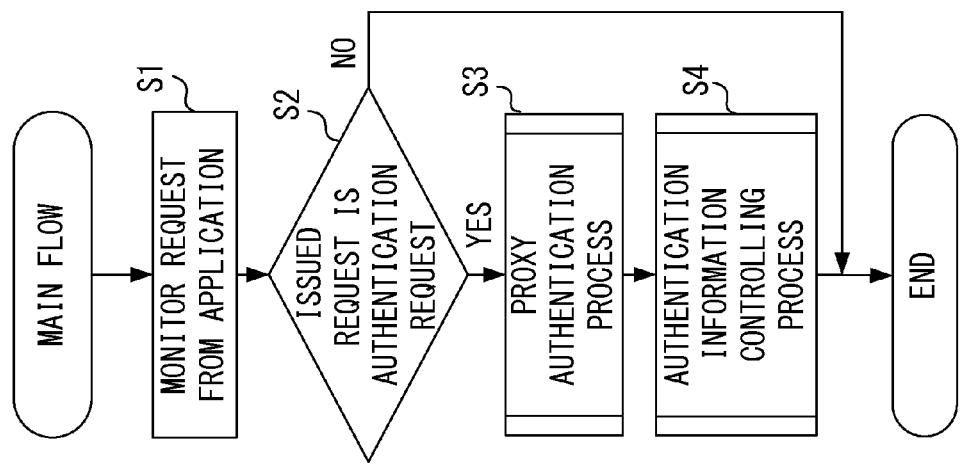

APPLICATION AUTHORIZATION LIST

```
IDENTIFICATION NUMBER, APP HASH VALUE,
REAUTHENTICATION FLAG 0001,ab123afeaa111111,true
0002,a1111afeaa111111,false
              .
              .
              .
```

FIG. 6

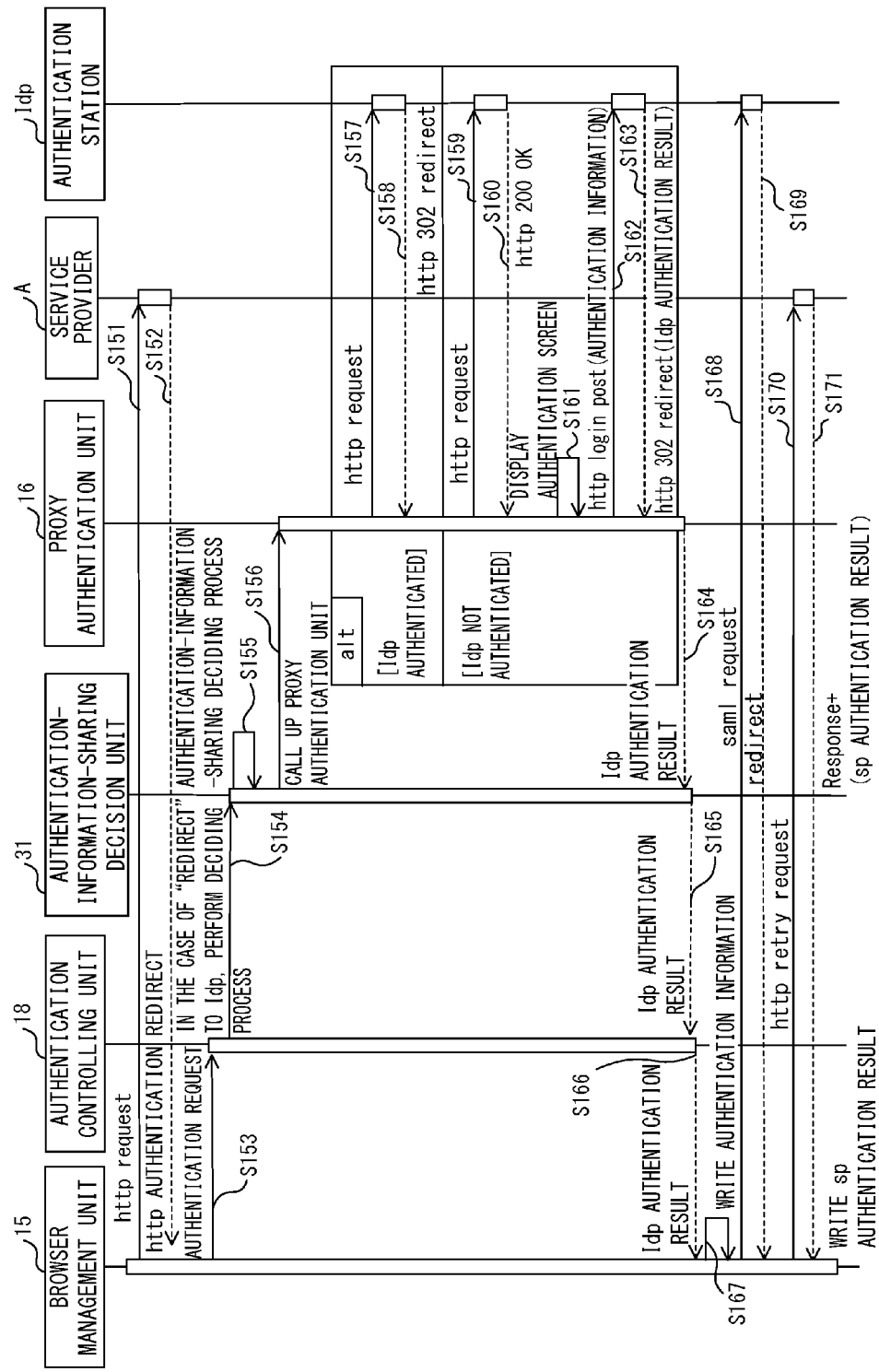
F I G. 11

COMMUNICATION TERMINAL AND COMMUNICATION PROCESSING METHOD

CROSS-REFERENCE TO RELATED APPLICATION

This application is based upon and claims the benefit of priority of the prior Japanese Patent Application No. 2013-212851, filed on Oct. 10, 2013, the entire contents of which are incorporated herein by reference.

FIELD

The embodiments discussed herein are related to a communication terminal and a communication processing method.

BACKGROUND

Examples of communication terminals include smartphones, portable phones, and tablet terminals. In addition to simply performing a communication, various applications have been able to be executed using a communication terminal in recent years.

Examples of applications executed using a communication terminal include an application called a "native application". The native application is directly executable on an Operating System (OS) of a communication terminal.

Examples of applications executed using a communication terminal also include an application called a "Web application". The Web application is executed on an execution environment having a browser function.

The native application and the Web application may be communicated with using services from an external server. When services from the external server are used, the native application and the Web application are authenticated. In this case, authentication information is requested. A cookie is an example of the authentication information. A technology has been proposed for using the cookie to authenticate a web client for a web server (see, for example, patent document 1).

Patent document 1: Japanese Laid-open Patent Publication No. 10-257048

SUMMARY

According to an aspect of the embodiments, a communication terminal including: a storage device and a processor configured to execute a process including: storing authentication information managed by a native environment of the communication terminal in a first storage region of the storage device; storing authentication information of an application to be executed on a Web application execution environment of the communication terminal in a second storage region of the storage device; and performing a control to write the authentication information stored in the first storage region to the second storage region when authentication information used by the application is not stored in the second storage region and is stored in the first storage region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A, 2B and 2C are flowcharts illustrating an exemplary authentication process in accordance with the first embodiment;

FIG. 6 illustrates an exemplary application authorization list;

FIG. 11 is a sequence diagram illustrating an exemplary process flow in accordance with the third embodiment.

DESCRIPTION OF EMBODIMENTS

An execution environment for executing a native application is different from an execution environment for executing a Web application. The authentication information of a native application is managed in an execution environment for the native application. Meanwhile, the authentication information of a Web application is managed in an execution environment for the Web application. That is, the native application and the Web application are separately managed.

Accordingly, authentication information managed in the execution environment for the native application and authentication information managed in the execution environment for the Web application may be different from each other. For example, in some cases, authentication information managed in the execution environment for the native application is not managed in the execution environment for the Web application.

In this case, the Web application performs an authentication process again to use services from an external Web server. An ID and a password are examples of the authentication information. In such a case, the user needs to enter the ID and the password again. That is, the user is asked to perform an authentication task, which is inconvenient.

<First Embodiment>

Figure 1:
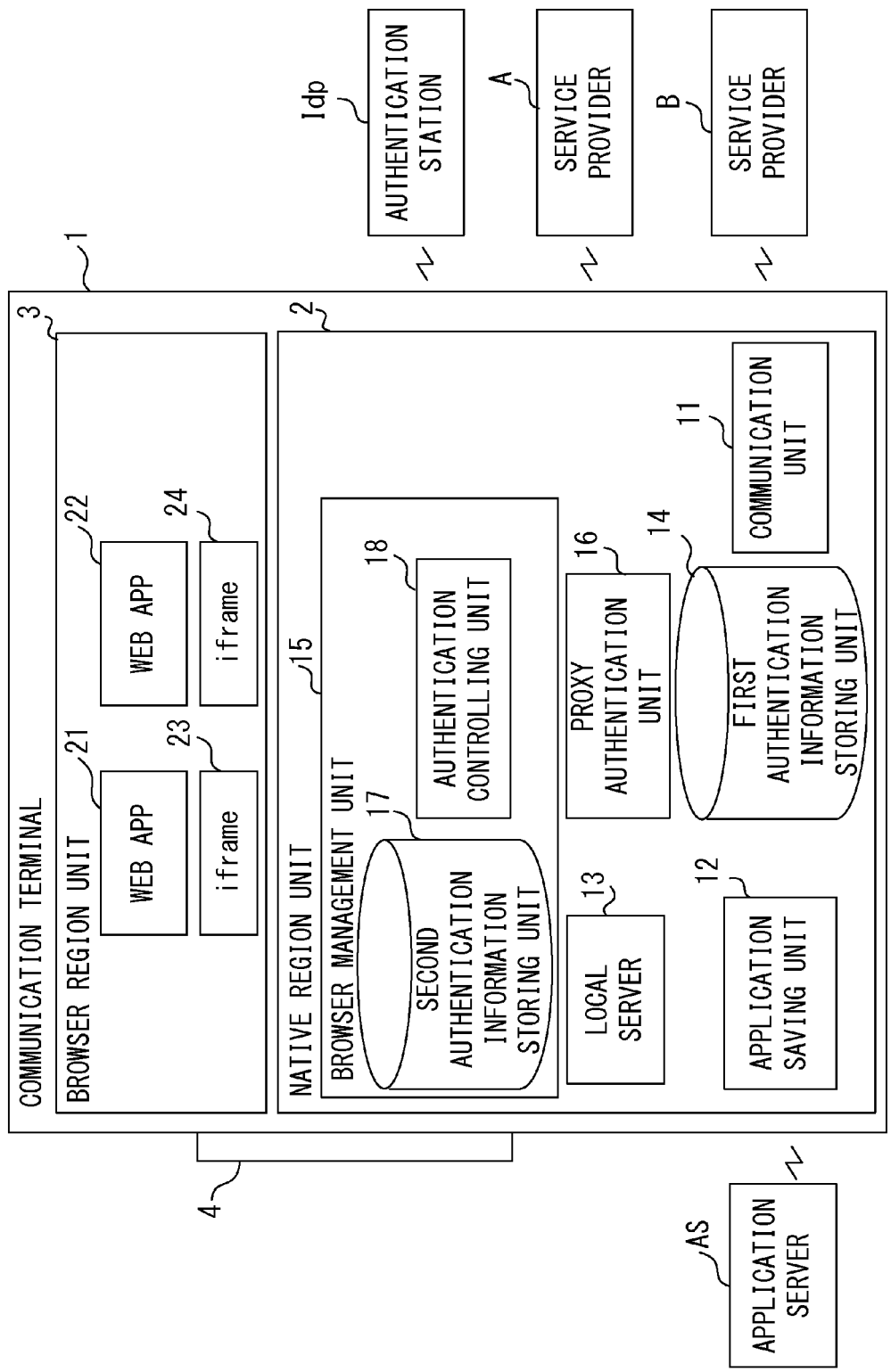
FIG. 1 illustrates an exemplary configuration of a communication terminal in accordance with a first embodiment.

The following will describe a first embodiment with reference to the drawings. FIG. 1 illustrates the configuration of a communication terminal in accordance with a first embodiment. A communication terminal 1 is capable of executing an application. An example of the communication terminal is a smartphone.

The communication terminal 1 may execute a native application and a Web application. The native application is not executed in an execution environment having a browser function (hereinafter simply referred to as a browser) but is executed in a native environment of the communication terminal 1. In one possible example, an OS of the communication terminal 1 directly executes the native application. Thus, the native application depends on the OS.

The Web application is executed on the browser of the communication terminal 1. The browser is an exemplary Web application execution environment. The Web application is executed on the browser and is thus dependent thereon. A Web application may hereinafter be simply referred to as an application.

Examples of the Web applications include a Hyper Text Markup Language (HTML) 5 application. The HTML5 application conforms to the HTML5 standard advocated by the World Wide Web Consortium (W3C).

The native application is executed in a native environment and is thus capable of using various APIs (Application Programming Interfaces) provided by the OS of the communication terminal 1. Meanwhile, Web applications are forbidden from using many of the APIs.

As depicted in the example of FIG. 1, the communication terminal 1 may communicate with an application server AS, an authentication station Idp, a service provider A, and a service provider B. Communications partners of the communication terminal 1 are not limited to those in the example of FIG. 1. In one possible example, the communication terminal 1 communicates with many service providers B.

The application server AS is an external server storing an application. In one possible example, the application server AS stores a Web application. The communication terminal 1 may communicate with the application server A to obtain (download) the Web application.

The authentication station Idp collectively manages authentication of the service providers A and B. The authentication station Idp may be referred to as an identity service provider B. The communication terminal 1 transmits information for use in authentication (which may hereinafter be referred to as authentication information) to the authentication station Idp, which performs authentication using the authentication information.

The service providers A and B are service providers that provide different services. A native application or Web application of the communication terminal 1 uses services provided by the service provider A or B.

The communication terminal 1 includes a native region unit 2 and a browser region unit 3. The native region unit 2 is an environment native to the communication terminal 1. That is, in the environment of a native region, an OS is directly associated with the region irrespective of browser operations. A native application is executed in the native region unit 2. The native application may use various APIs provided by the native region unit 2.

The browser region unit 3 is an environment for executing a browser and is also referred to as a Web region. A Web application is executed in the browser region unit 3. The Web application can use some APIs provided by the native region unit 2. However, the Web application is prohibited to use some APIs provided by the native region unit 2.

The communication terminal 1 includes a display input unit 4. As an example, the display input unit 4 may be a touch panel display. The display input unit 4 displays predetermined information, and the user may operate the display input unit 4 to input predetermined information. The display input unit 4 includes both a displaying device and an inputting device, but the displaying device and the inputting device may be separately provided.

The native region unit 2 includes a communication unit 11, an application storing unit 12, a local server 13, a first authentication information storing unit 14, a browser managing unit 15, and a proxy authentication unit 16. The communication unit 11 communicates with external elements such as the application server AS, the authentication station Idp, and the service providers A and B.

The application storing unit 12 stores an application obtained from the application server AS. In one possible example, the application is encrypted and stored in the application storing unit 12 in a source-code format.

A local server 13 is a virtual Web server provided in the native region unit 2. For a Web application that is an HTML5 application, a Uniform Resource Locator (URL) that includes an origin is allocated to the HTML5 application. The local server 13 allocates a URL for use in the communication terminal 1 to the HTML5 application.

The first authentication information storing unit 14 stores authentication information managed by the native region unit 2. In one possible example, the first authentication information storing unit 14 stores authentication information of a native application. The first authentication information storing unit 14 stores the authentication information of a service of the service provider A when the native application has used the service of the service provider A before. The first authentication information storing unit 14 is an example of the first storage unit or the first storage region.

The browser managing unit 15 manages the browser region unit 3. The browser managing unit 15 may be referred to as Webview. The browser managing unit 15 includes a second authentication information storing unit 17 and an authentication controlling unit 18.

The proxy authentication unit 16 performs an authentication task as a proxy for a Web application. When a Web application issues an authentication request, the proxy authentication unit 16 obtains that authentication request and performs an authentication task by proxy. The proxy authentication unit 16 is an example of the proxy authentication unit.

The second authentication information storing unit mainly stores authentication information of the Web application. For example, the second authentication information storing unit 17 stores the authentication information of a service of the service provider A when the Web application has used the service of the service provider A before. The second authentication information storing unit 17 is an example of the second storage unit or the second storage region.

Under a predetermined condition, the authentication controlling unit 18 writes authentication information stored in the second authentication information storing unit 17 to the first authentication information storing unit 14. The authentication controlling unit 18 also monitors a request issued by a Web application. An example of the request is an "http request".

When a Web application makes a request related to authentication, the authentication controlling unit 18 obtains and outputs that request to the proxy authentication unit 16. Meanwhile, the authentication controlling unit 18 does not receive a request from a Web application that is not related to authentication. The authentication controlling unit 18 is an example of the controlling unit.

The browser region unit 3 is an environment to execute one or more Web applications. In FIG. 1, Web applications are indicated as "Web app". In the example of FIG. 1, the browser region unit 3 includes a Web app 21, a Web app 22, an iframe 23, and an iframe 24.

The Web applications 21 and 22 are different Web applications. Both of these applications are executed on a browser. The iframe 23 is an inline frame and divides the Web application 21 from other Web applications. The iframe 24 is also an inline frame and divides the Web application 22 from other Web applications.

The following will describe an exemplary authentication process with reference to the flowcharts of FIG. 2. FIGS. 2A through 2C are based on an authentication process performed under a condition in which the Web application 21 uses services of the service provider A.

As depicted in FIG. 2A, the authentication controlling unit 18 monitors requests from the Web applications within the browser region unit 3 (step S1). The Web applications issue various requests. As an example, a Web application 21 may issue an "http request", and the authentication controlling unit 18 may monitor the "http request" from the Web application using a callback function.

The authentication controlling unit 18 determines whether a request issued by the Web application 21 is an authentication request (step S2). When the request issued by the Web application 21 is not an authentication request (NO in step S2), the process ends.

Meanwhile, when the request issued by the Web application 21 is an authentication request (YES in step S2), a proxy authentication process is performed (step S3). Then, an authentication information controlling process is performed (step S4).

FIG. 2B depicts the proxy authentication process of step S3. As a proxy for the Web application 21, the proxy authentication unit 16 makes a request for the authentication station Idp to perform authentication (step S5). Accordingly, the proxy authentication unit 16 controls the communication unit 11 to transmit the authentication request to the authentication station Idp.

The authentication station Idp receives the authentication request transmitted from the communication terminal 1. The authentication station Idp decides whether the received authentication request has already been authenticated (step S6). When the authentication station Idp determines that the received authentication request has not been authenticated (NO in step S6), the authentication station Idp sends a report that indicates the received authentication request has not been authenticated to the communication terminal 1.

Upon receiving a report from the authentication station Idp indicating that the request has not been authenticated, the proxy authentication unit 16 causes the display input unit 4 to display an authentication screen (step S7). As an example, the authentication screen may be a screen requesting that an ID and a password be entered.

The proxy authentication unit 16 controls the communication unit 11 to transmit authentication information to the authentication station Idp (step S8). The authentication station Idp performs authentication of the received authentication information. In one possible example, the authentication station Idp determines whether an ID and a password for use of the service provider A are identical with the received ID and password. When they are identical, authentication succeeds. When they are not identical, authentication fails.

The authentication station Idp transmits an authentication result to the communication terminal 1. The communication unit 11 receives and outputs the authentication result to the proxy authentication unit 16. Accordingly, the proxy authentication unit 16 inputs the authentication result (step S9).

When the authentication station Idp determines in step S6 that the received authentication request has already been authenticated (YES in step S6), the processes of steps S7-S9 are not performed. That is, the user does not need to enter an ID, password, or the like.

As depicted in FIG. 2C, the authentication controlling unit 18 obtains authentication information (step S10). When it is determined in step S6 that the authentication request has not been authenticated, the authentication controlling unit 18 obtains authentication information from the proxy authentication unit 16. When the request is determined to have been authenticated in step S6, the authentication information has been stored in the first authentication information storing unit 14. In this case, accordingly, the authentication controlling unit 18 obtains authentication information from the first authentication information storing unit 14.

Then, the authentication controlling unit 18 writes the authentication information to the second authentication information storing unit 17 (step S11). Hence, when an authentication request that the communication terminal 1 transmits to the authentication station Idp has already been authenticated, a request is not made for the user to perform an authentication task again. This may facilitate the authentication task in using an application of the communication terminal.

Figure 3:
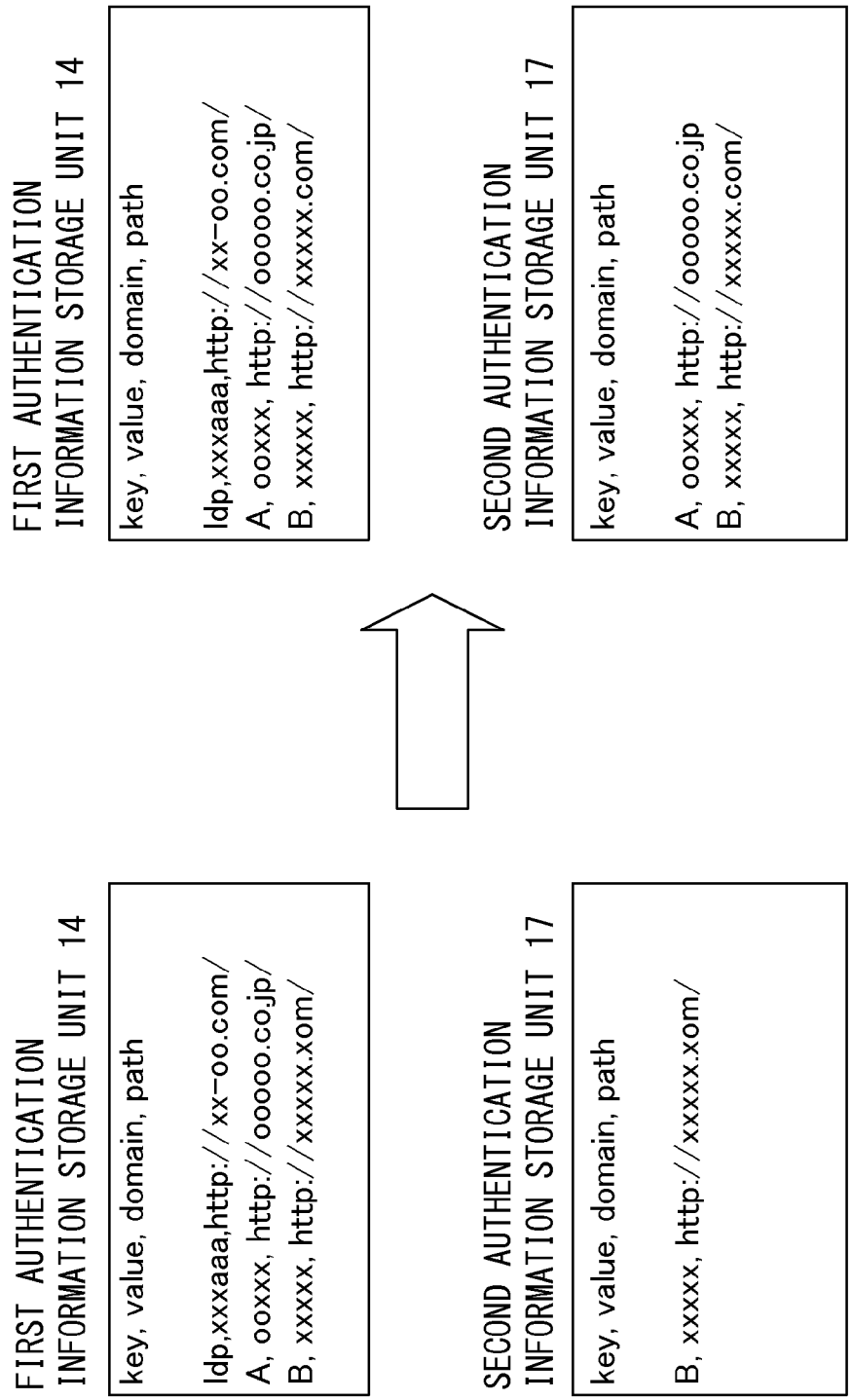
FIG. 3 illustrates an example of authentication information in accordance with the first embodiment.

FIG. 3 depicts exemplary authentication information stored in the first authentication information storing unit 14 and the second authentication information storing unit 17. In FIG. 3, "key" indicates information such as the service provider B. "value" indicates predetermined information including an authentication result. "domain" and "path" indicate location information of a service used by a Web application.

As depicted in FIG. 3, the authentication information of the service provider A is stored in the first authentication information storing unit 14. That is, it is determined in step S6 that an authentication request transmitted by the communication terminal has already been authenticated. Hence, the processes of steps S7-S9 are skipped.

In step S11, authentication information is written to the second authentication information storing unit 17. Since the authentication information of the service provider A has already been authenticated, the authentication controlling unit 18 writes the authentication information stored in the first authentication information storing unit 14 to the second authentication information storing unit 17. Hence, the authentication information of the service provider A is stored in the second authentication information storing unit 17, as depicted in FIG. 3.

Accordingly, the authentication information stored in the second authentication information storing unit 17 is used when the Web application 21 uses a service of the service provider A. Thus, the user does not need to input information for authentication. This may facilitate the authentication task.

Figure 4:
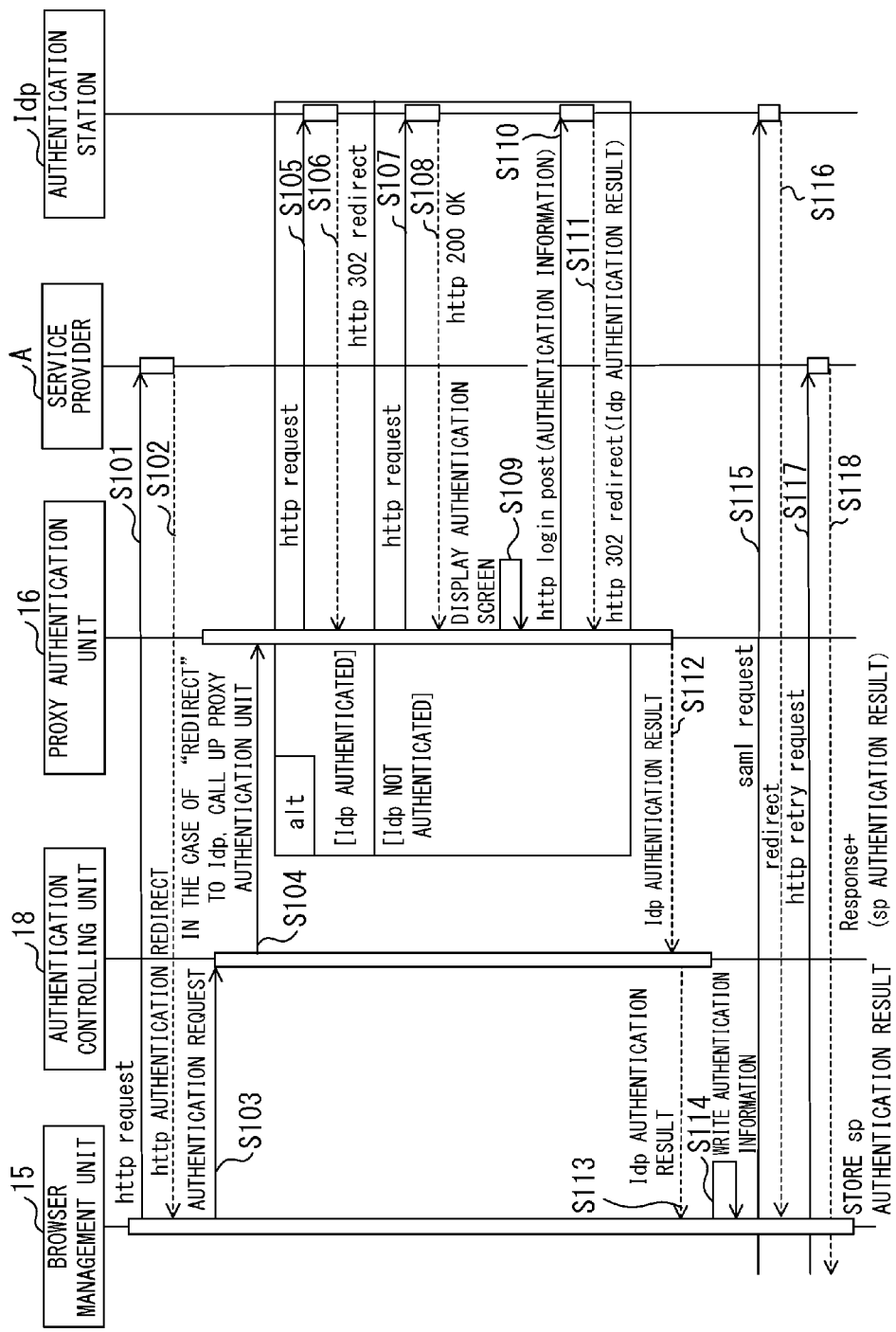
FIG. 4 is a sequence diagram illustrating an exemplary process flow in accordance with the first embodiment.

The following will describe the entirety of the process flow with reference to the sequence diagram of FIG. 4. First, the Web application 21 issues a request to use of a service of the service provider A (step S101).

Assume that the request is an "http request". The authentication controlling unit 18 monitors the "http request", but a process related to authentication is not performed since the request does not relate to authentication. Thus, the request from the Web application 21 is transmitted to the service provider A.

In response to the request from the Web application 21, the service provider A makes a request for the communication terminal 1 to perform authentication for the use of the service (step S102). In one possible example, the service provider A responds to the request from the Web application 21 by transmitting "http authentication redirect".

The Web application 21 issues an authentication request for the authentication station Idp. The authentication controlling unit 18 of the browser managing unit 15 obtains the authentication request. The browser managing unit 15 calls up the authentication controlling unit 18 (step S103). In the case of a "redirect" to the authentication station Idp, the authentication controlling unit 18 calls up the proxy authentication unit 16 (step S104).

To make a request for the authentication station Idp to perform authentication, the proxy authentication unit 16 controls the communication unit 11 to transmit the authentication request to the authentication station Idp. The authentication station Idp performs different processes in accordance with whether the received authentication request has been authenticated.

First, descriptions will be given of a situation in which the authentication station Idp has received an authentication request that has been authenticated. A process for "Idp authenticated" in FIG. 14 will be performed. As a proxy for the Web application 21, the proxy authentication unit 16 makes a request for the authentication station Idp to perform authentication (step S105). In one possible example, the proxy authentication unit 16 controls the communication unit 11 to transmit a "http request" to the authentication station Idp.

The authentication station Idp checks whether the authentication request transmitted from the communication terminal 1 has already been authenticated. In the case of "Idp authenticated", the authentication station Idp decides that the authentication request transmitted from the communication terminal 1 has already been authenticated.

The authentication station Idp sends to the communication terminal 1 a response indicating that the authentication request transmitted from the communication terminal 1 has already been authenticated (step S106). In one possible example, the authentication station Idp transmits an "http 302 redirect" to the communication terminal 1. The communication unit 11 receives and outputs the response to the proxy authentication unit 16. The proxy authentication unit 16 recognizes that the authentication request issued by the Web application 21 has already been authenticated.

Next, descriptions will be given of a situation in which the authentication station Idp has received an authentication request that has not been authenticated. As a proxy for the Web application 21, the proxy authentication unit 16 makes a request for the authentication station Idp to perform authentication (step S107). In one possible example, the proxy authentication unit 16 controls the communication unit 11 to transmit a "http request" to the authentication station Idp.

The authentication station Idp checks whether the authentication request transmitted from the communication terminal 1 has already been authenticated. In the case of "Idp not authenticated", the authentication station Idp determines that the authentication request transmitted from the communication terminal 1 has not been authenticated.

The authentication station Idp sends to the communication terminal 1 a response indicating that the authentication request transmitted from the communication terminal 1 has not been authenticated (step S108). In one possible example, the authentication station Idp transmits an "http 200 OK" to the communication terminal 1.

The proxy authentication unit 16 performs a control to display an authentication screen on the display input unit 4. Through this control, the display input unit 4 displays the authentication screen (step S109). As described above, the display input unit 4 displays, for example, an authentication screen requesting that an ID and a password be entered. The user enters an ID and a pas sword according to the authentication screen displayed on the display input unit 4.

The proxy authentication unit 16 defines the entered ID and password as authentication information and transmits this information to the authentication station Idp (step S110). An example of the authentication information transmitted by the proxy authentication unit 16 is "http login post".

The authentication station Idp performs authentication of the authentication information transmitted by the proxy authentication unit 16. Authentication succeeds when authentication information held by the authentication station Idp is identical with the authentication information transmitted by the proxy authentication unit 16; otherwise, authentication fails.

The authentication station Idp transmits the authentication result to the communication terminal 1 (step S11). In an embodiment, the authentication result is an Idp authentication result. As an example, the Idp authentication result may be "http 302 redirect". The communication unit 11 outputs the Idp authentication result to the proxy authentication unit 16.

The proxy authentication unit 16 outputs the Idp authentication result to the authentication controlling unit 18 (step S112). The authentication controlling unit 18 outputs the Idp authentication result to the browser managing unit 15 (step S113). The browser managing unit 15 outputs the authentication result to the Web application 21 that is to be executed on the browser.

In the case of performing the flow for "Idp not authenticated", the authentication information requested by the Web application 21 is not stored in the first authentication information storing unit 14. Hence, according to the Idp authentication result received from the authentication station Idp, the proxy authentication unit 16 writes authentication information to the second authentication information storing unit 17 (step S114).

Meanwhile, in the case of performing the flow for "Idp authenticated", the authentication information requested by the Web application 21 is stored in the first authentication information storing unit 14. Hence, the authentication controlling unit 18 reads the authentication information from the first authentication information storing unit 14 and, in step S114, writes this information to the second authentication information storing unit 17.

The browser managing unit 15 makes a request for the authentication station Idp to exchange authentication information with the service provider A (step S115). An example of the request is a "saml request". The authentication station Idp transmits to the communication terminal 1 a response to the request to exchange authentication information (step S116). An example of the response is "redirect".

The browser managing unit 15 transmits a request that the Web application 21 uses the service of the service provider A (which may be referred to as an entry request) (step S117). An example of the request is an "http retry request". The service provider A responds to the entry request for the Web application 21 (step S118).

The response made in step S118 includes the result of authentication of the service provider A. In FIG. 4, the response is indicated as "Response+(sp authentication result)". The browser managing unit 15 stores the authentication result. Hence, successful authentication allows the Web application 21 to use the service provided by the service provider A.

Accordingly, in the first embodiment, the native region unit 2 manages authentication of the Web application 21. That is, the native region unit 2 manages the authentication information stored in the first authentication information storing unit 14 and the authentication information stored in the second authentication information storing unit 17 in a unified manner.

Hence, when the second authentication information storing unit 17 does not store authentication information used by the Web application 21, the authentication controlling unit 18 writes, to the second authentication information storing unit 17, authentication information stored in the first authentication information storing unit 14.

Thus, in the using of the Web application 21, the user does not need to input authentication information. That is, authentication of the Web application 21 is performed without the user performing the authentication task. Hence, a request is not made for the user to perform the authentication task again, thereby improving convenience in using a Web application.

<Second Embodiment>

The following will describe a second embodiment. In the first embodiment, the authentication controlling unit 18 writes authentication information stored in the first authentication information storing unit 14 to the second authentication information storing unit 17. However, in terms of security, there are cases that authentication information stored in the first authentication information storing unit 14 is not written to the second authentication information storing unit 17.

Accordingly, in the second embodiment, it is determined whether to write authentication information stored in the first authentication information storing unit 14 to the second authentication information storing unit 17. According to the determination, it is determined whether to write authentication information stored in the first authentication information storing unit 14 to the second authentication information storing unit 17.

Figure 5:
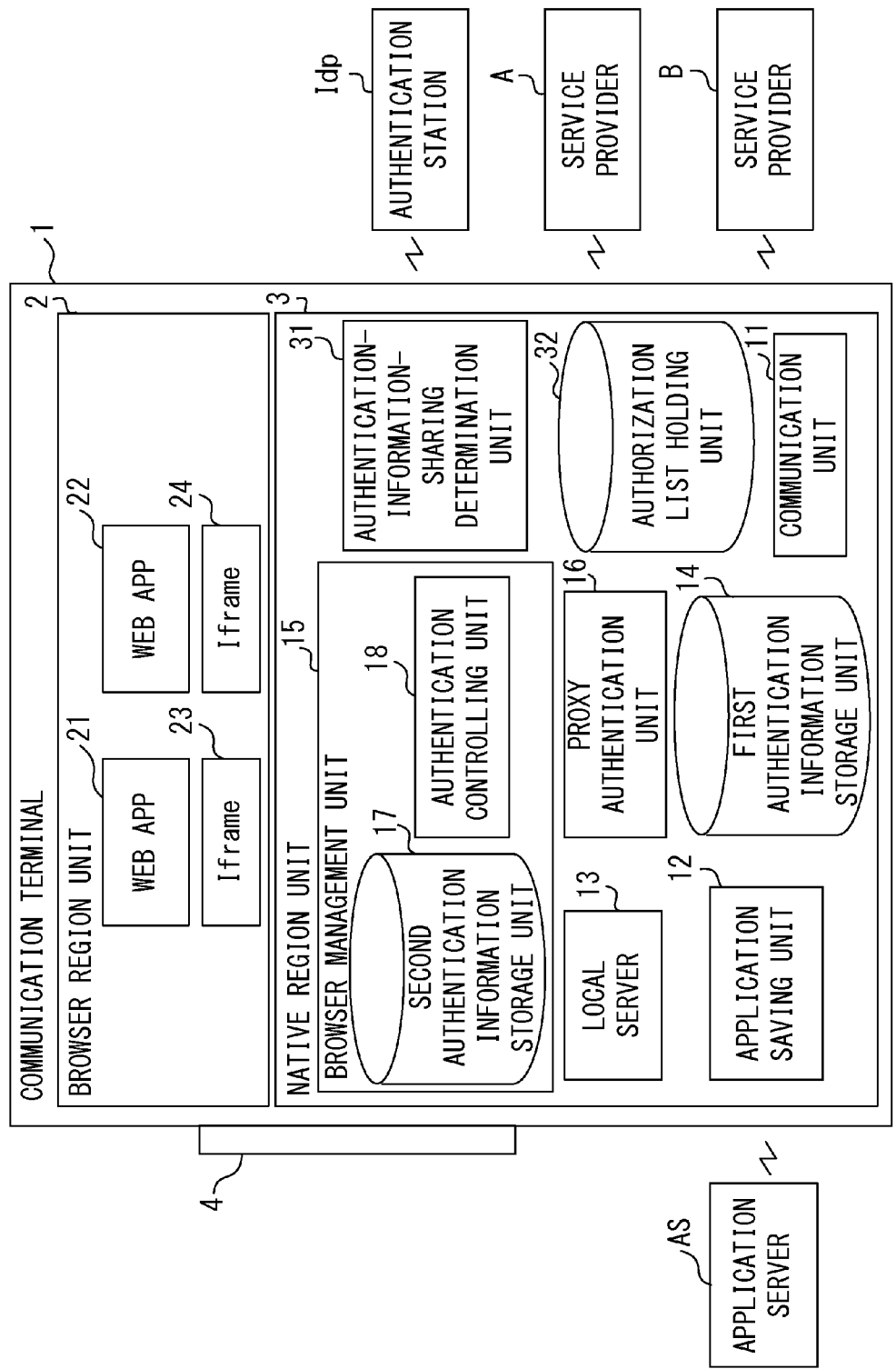
FIG. 5 illustrates an exemplary configuration of a communication terminal in accordance with a second embodiment.

FIG. 5 depicts an example of the second embodiment. As illustrated in FIG. 5, the configuration of the second embodiment includes an authentication-information-sharing determination unit 31 and an authorization list holding unit 32. In regard to the other components, the second embodiment is the same as the first embodiment.

The authentication-information-sharing determination unit 31 decides whether to write authentication information stored in the first authentication information storing unit 14 to the second authentication information storing unit 17. That is, the authentication-information-sharing determination unit 31 decides whether to share authentication information between the first authentication information storing unit 14 and the second authentication information storing unit 17. The authentication-information-sharing determination unit 31 is an example of the determination unit.

The authorization list holding unit 32 holds a list indicating authorization of the use of authentication information. The list will hereinafter be referred to as an application authorization list. The authorization list holding unit 32 is an example of the first holding unit.

FIG. 6 illustrates an exemplary application authorization list. The application authorization list includes the three items of identification number, app hash value, and reauthentication flag. An identification number is a number allocated to an authorized application. An app hash value is a hash value calculated to identify an application. Note that information for identification of an application is not limited to a hash value.

A reauthentication flag indicates whether authentication of an already authenticated application is performed again. When the reauthentication flag is "true", authentication of the application needs to be performed again. When the reauthentication flag is "false", authentication of the application does not need to be performed again.

As an example, the app hash value of identification number "0001" is "ab123afeaa111111". An application having that app hash value is authorized to use. Since the reauthentication flag is "true", authentication of the application is performed again.

Figure 7:
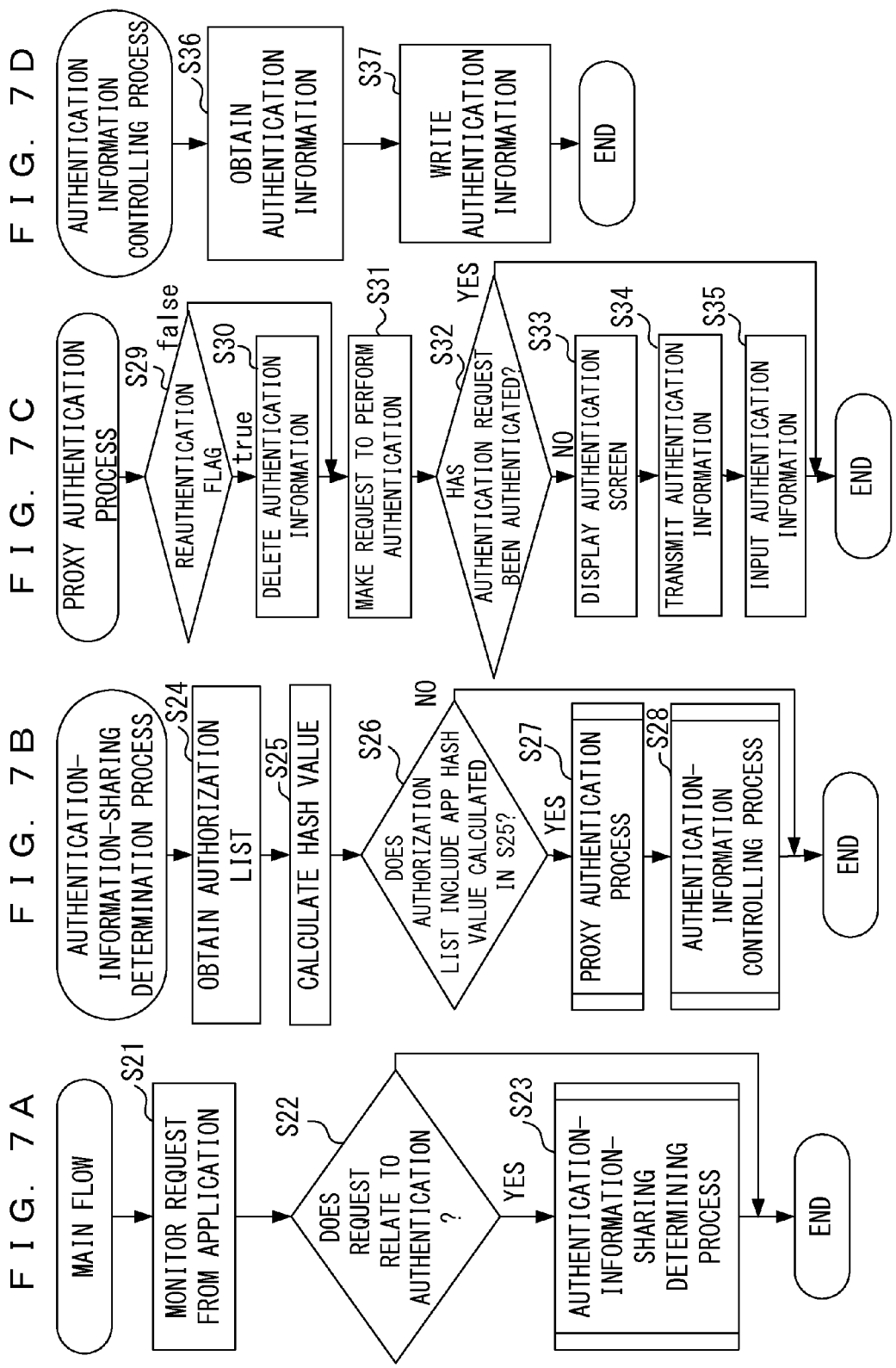
FIGS. 7A, 7B, 7C and 7D are flowcharts illustrating an exemplary authentication process in accordance with the second embodiment.

Next, an authentication process of the second embodiment will be described with reference to the flowchart of FIG. 7. As depicted in FIG. 7A, the authentication controlling unit 18 monitors requests from Web applications present within the browser region unit 3 (step S21).

When a Web application 21 makes a request, the authentication controlling unit 18 determines whether that request relates to authentication (step S22). When the authentication controlling unit 18 determines that the request does not relate to authentication (NO in step S22), the authentication controlling unit 18 terminates the process. Meanwhile, when the authentication controlling unit 18 determines that the request relates to authentication (YES in step S22), the authentication controlling unit 18 performs an authentication-information-sharing determining process (step S23).

FIG. 7B illustrates the authentication-information-sharing determination process of step S23. The authentication-information-sharing determination unit 31 obtains an authorization list from the authorization list holding unit 32 (step S24). The authentication-information-sharing determination unit 31 also calculates the hash vale of the Web application 21 that has made the request related to authentication (step S25).

The authentication-information-sharing determination unit 31 determines whether the app hash value of the Web application 21 is included in the authorization list as an app hash value (step S26). When the app hash value of the Web application 21 is not included in the authorization list, the Web application 21 has not been authorized.

Accordingly, the authentication-information-sharing determination unit 31 terminates the process without sharing authentication information between the first authentication information storing unit 14 and the second authentication information storing unit 17. When the app hash value of the Web application 21 is included in the authorization list, the Web application 21 has been authorized.

In this case, the proxy authentication unit 16 performs a proxy authentication process (step S27). After performing the proxy authentication process, the proxy authentication unit 16 also performs an authentication-information-controlling process (step S28). FIG. 7C illustrates the flow of the proxy authentication process. The proxy authentication unit 16 determines which of "true" or "false" the authorization list indicates as a reauthentication flag corresponding to the app hash value of the Web application 21 (step S29).

When the reauthentication flag is "true", the proxy authentication unit 16 deletes authentication information stored in the first authentication information storing unit 14 and authentication information stored in the second authentication information storing unit 17 (step S30). Authentication is performed again when the reauthentication flag is "true".

The reauthentication flag is "true" for a Web application 21 for which, in terms of security, authentication is preferably performed every time. As an example, when a high level of security is used, e.g., when the Web application 21 deals with personal information stored in the communication terminal 1, the reauthentication flag is "true".

Meanwhile, when the reauthentication flag is "false", the proxy authentication unit 16 does not perform the deleting of authentication information in step S30. When a high level of security is not used, authentication does not need to be performed every time. Hence, authentication information is not deleted. The descriptions above have been given on the assumption that the reauthentication flag is "true" or "false"; however, as long as it can be decided whether to perform authentication again, any technique may be used instead of using the reauthentication flag.

Next, as a proxy for the Web application 21, the proxy authentication unit 16 makes a request for the authentication station Idp to perform authentication (step S31). The authentication station Idp determines whether the received authentication request has already been authenticated (step S32). When the authentication station Idp determines that the received authentication request has not been authenticated (NO in step S32), the authentication station Idp sends a report that the authentication request has not been authenticated to the communication terminal 1.

When the report is received from the authentication station Idp indicating that the authentication request has not been authenticated, the proxy authentication unit 16 displays an authentication screen on the display input unit 4 (step S33). Using the authentication screen, the user inputs predetermined information to be used for authentication information. The proxy authentication unit 16 controls the communication unit to transmit the authentication information to the authentication station Idp (step S34). The authentication station Idp performs authentication of the received authentication information.

The authentication station Idp transmits an authentication result to the communication terminal 1. The communication unit 11 receives and outputs the authentication result to the proxy authentication unit 16. Accordingly, the proxy authentication unit 16 inputs the authentication result (step S35).

When the authentication station Idp determines in step S32 that the received authentication request has already been authenticated (YES in step S32), the processes of steps S33-S35 are not performed. Next, as depicted in FIG. 7D, the authentication controlling unit 18 obtains authentication information (step S36).

When it is determines in step S32 that the authentication request has not been authenticated, the authentication controlling unit 18 obtains authentication information from the proxy authentication unit 16. When it is determined that the authentication request is determined to have been authenticated in step S32, the authentication information is stored in the first authentication information storing unit 14. Hence, in such a case, the authentication controlling unit 18 obtains the authentication information from the first authentication information storing unit 14.

The authentication controlling unit 19 writes the authentication information to the second authentication information storing unit 17 (step S37). Thus, when the communication terminal 1 transmits an already authenticated authentication request to the authentication station Idp, the user does not need to perform the authentication task again. This may facilitate the authentication task in using an application of the communication terminal.

Figure 8:
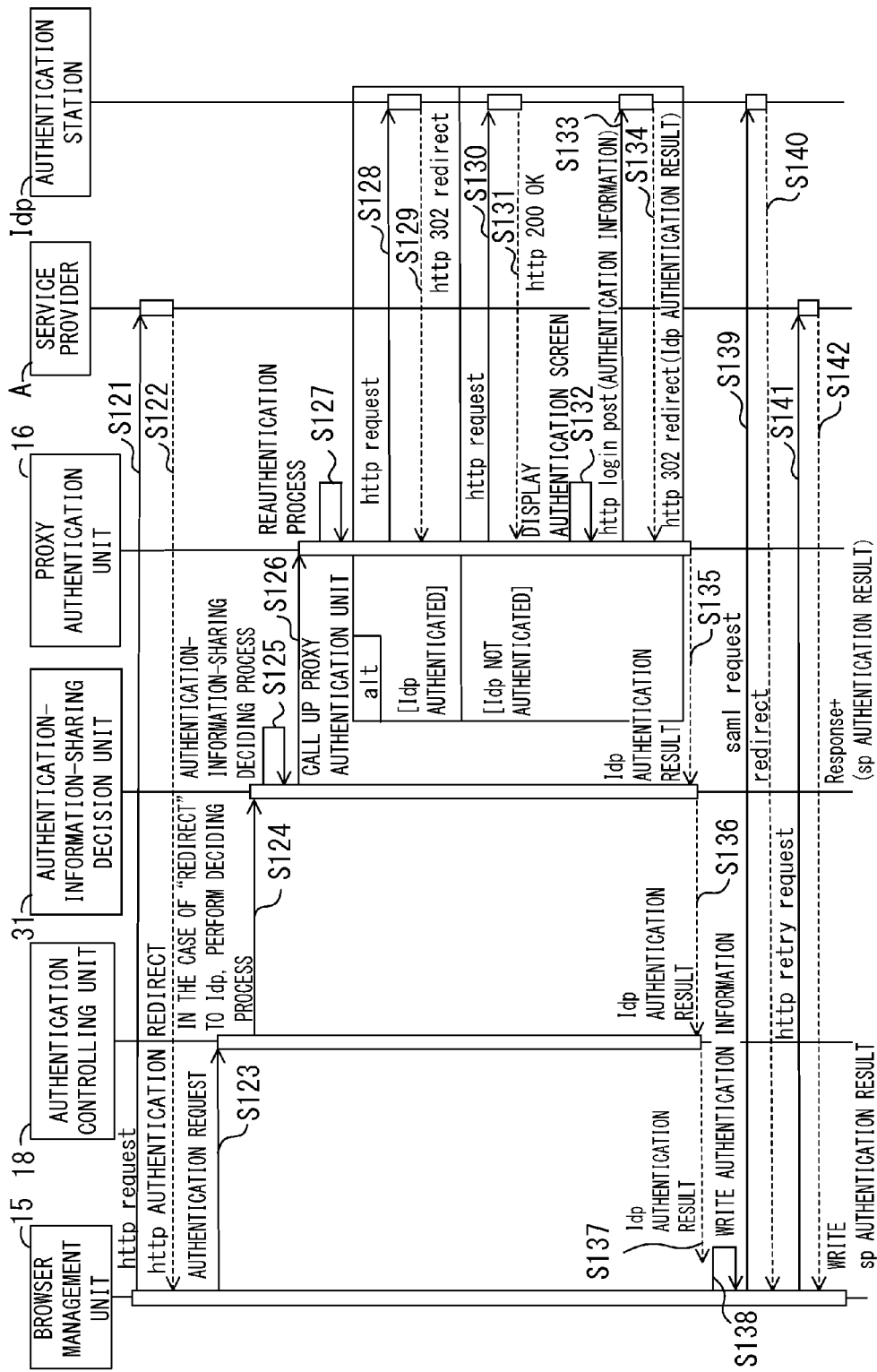
FIG. 8 is a sequence diagram illustrating an exemplary process flow in accordance with the second embodiment.

The following will describe the flow of the entirety of the process with reference to the sequence diagram of FIG. 8. First, a Web application 21 makes a request to authorize the use of the service provider A. The request is transmitted to the service provider A (step S121).

At the request from the Web application 21, the service provider A makes a request for the communication terminal 1 to perform authentication for the use of the service (step S122). The Web application 21 issues an authentication request for the authentication station Idp. The authentication controlling unit 18 of the browser managing unit 15 obtains the authentication request.

The browser managing unit 15 calls up the authentication controlling unit 18 (step S123). In the case of "redirect" to the authentication station Idp, the authentication controlling unit 18 calls up the authentication-information-sharing determination unit 31 (step S124).

The authentication-information-sharing determination unit 31 determines whether an authorization list held by the authorization list holding unit 32 includes the Web application 21. That is, the authentication-information-sharing determination unit 31 determines whether to share authentication information (step S125).

When the authentication-information-sharing determination unit 31 determines to share authentication information, the authentication-information-sharing determination unit 31 calls up the proxy authentication unit (step S126). Meanwhile, when the authentication-information-sharing determination unit 31 determines to not share authentication information, the authentication-information-sharing determination unit 31 does not call up the proxy authentication unit 16.

When the authentication-information-sharing determination unit 31 calls up the proxy authentication unit 16, the proxy authentication unit 16 performs a reauthentication process (step S127). The reauthentication process is a process of deleting authentication information stored in the first authentication information storing unit 14 and the second authentication information storing unit 17 when a reauthentication flag included in the authorization list and corresponding to the Web application 21 is "true".

To make a request for the authentication station Idp to perform authentication, the proxy authentication unit 16 controls the communication unit 11 to transmit the authentication request to the authentication station Idp. The authentication station Idp performs different processes in accordance with whether the received authentication request has been authenticated.

First, descriptions will be given of a situation in which the authentication station Idp has received an authentication request that has been authenticated. A process for "Idp authenticated" in FIG. 8 will be performed. As a proxy for the Web application 21, the proxy authentication unit 16 makes a request for the authentication station Idp to perform authentication (step S128).

The authentication station Idp sends to the communication terminal 1 a response indicating that the authentication request transmitted from the communication terminal 1 has already been authenticated (step S129). The communication unit 11 receives and outputs the response to the proxy authentication unit 16. The proxy authentication unit 16 recognizes that the authentication request issued by the Web application 21 has already been authenticated.

Next, descriptions will be given of a situation in which the authentication station Idp has received an authentication request that has not been authenticated. As a proxy for the Web application 21, the proxy authentication unit 16 makes a request for the authentication station Idp to perform authentication (step S130). The authentication station Idp checks whether the authentication request transmitted from the communication terminal 1 has already been authenticated. In the case of "Idp not authenticated", the authentication station Idp determines that the authentication request transmitted from the communication terminal 1 has not been authenticated.

When the reauthentication process is performed in step S127, authentication information stored in the first authentication information storing unit 14 and the second authentication information storing unit 17 are deleted. Hence, the flow for "Idp authentication invalid" is performed.

The authentication station Idp sends to the communication terminal 1 a result indicating that the authentication request transmitted from the communication terminal 1 has not been authenticated (step S131). The proxy authentication unit 16 displays an authentication screen on the display input unit 4 (step S132). In one possible example, the user enters an ID and a password using the authentication screen.

The proxy authentication unit 16 defines the entered ID and password as authentication information and transmits this information to the authentication station Idp (step S133). The authentication station Idp performs authentication of the authentication information transmitted by the proxy authentication unit 16.

The authentication station Idp transmits the authentication result to the communication terminal 1 (step S134). The proxy authentication unit 16 outputs the Idp authentication result to the authentication-information-sharing determination unit 31 (step S135). The authentication-information-sharing determination unit 31 outputs the Idp authentication result to the authentication controlling unit 18 (step S136). The authentication controlling unit 18 outputs the Idp authentication result to the browser managing unit 15 (step S137). The browser managing unit 15 outputs the authentication result to the Web application 21 that is to be executed on the browser.

In performing the flow for "Idp not authenticated", the proxy authentication unit 16 stores authentication information in both the first authentication information storing unit 14 and the second authentication information storing unit 17 (step S138). Meanwhile, in performing the flow for "Idp authenticated", the proxy authentication unit 16 writes authentication information stored in the first authentication information storing unit 14 to the second authentication information storing unit 17.

Accordingly, the first authentication information storing unit 14 and the second authentication information storing unit 17 may share authentication information with each other. However, authentication information is not shared when the authentication-information-sharing determination unit 31 decides to not share authentication information in step S125.

The browser managing unit 15 makes a request for the authentication station Idp to exchange authentication information with the service provider A (step S139). The authentication station Idp transmits to the communication terminal 1 a response to the request to exchange authentication information (step S140).

The browser managing unit 15 transmits a request that the Web application 21 uses the service of the service provider A (step S141). The service provider A responds to the entry request for the Web application 21 (step S142).

The response includes the result of authentication of the service provider A. In FIG. 8, the response is indicated as "Response+(sp authentication result)". The browser managing unit 15 stores the result of authentication of the service provider A. Hence, successful authentication allows the Web application 21 to use the service provided by the service provider A.

As with the first embodiment, the second embodiment may facilitate the authentication task in using an application of the communication terminal. In addition, high security authentication is achievable. This may lead to both high security and convenience for the user.

<Third Embodiment>

Figure 9:
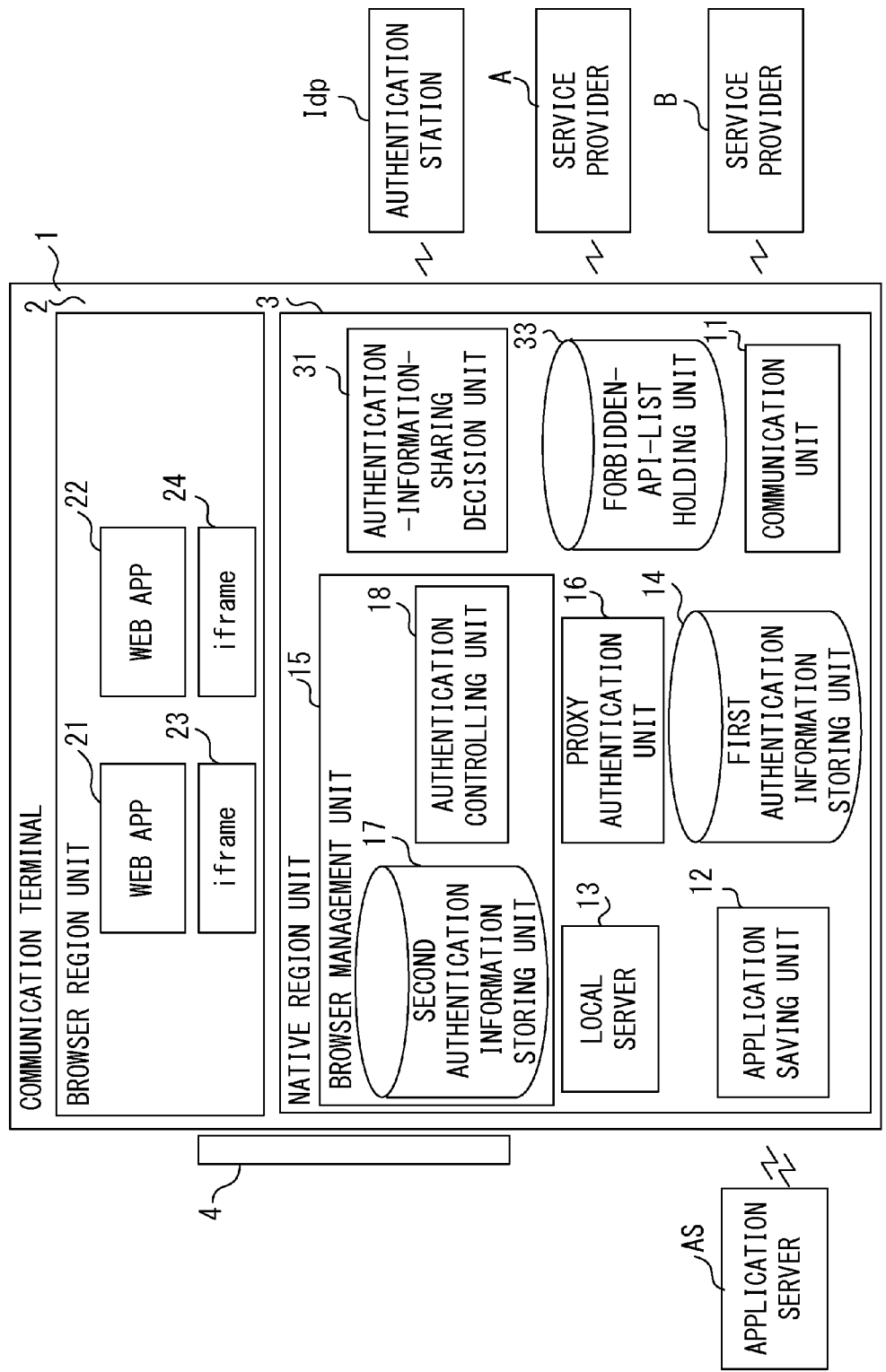
FIG. 9 illustrates an exemplary configuration of a communication terminal in accordance with a third embodiment.

The following will describe a third embodiment. Instead of the authorization list holding unit 32 depicted in FIG. 5, the communication terminal 1 in FIG. 9 includes a forbidden-API-list holding unit 33. The forbidden-API-list holding unit 33 holds a forbidden API list. The forbidden-API-list holding unit 33 is an example of the second holding unit.

An API is used as a function of the communication terminal 1. A native application is executed in the native environment of the communication terminal 1 and can thus use many APIs. Meanwhile, a Web application can use fewer APIs than the number of APIs a native application can use.

That is, a Web application is forbidden from using many of the APIs. The APIs that a Web application is forbidden from using will hereinafter be referred to as forbidden APIs. An exemplary forbidden API is "File.read( )". This API reads a file stored in the communication terminal 1. Another exemplary forbidden API is "Camera.exec( )". This API uses a camera function of the communication terminal 1.

For the sake of safety, Web applications may be forbidden from using the forbidden APIs. Accordingly, when a Web application that has issued an authentication request is an application that uses a forbidden API, the first authentication information storing unit 14 and the second authentication information storing unit 17 do not share authentication information.

Figure 10:
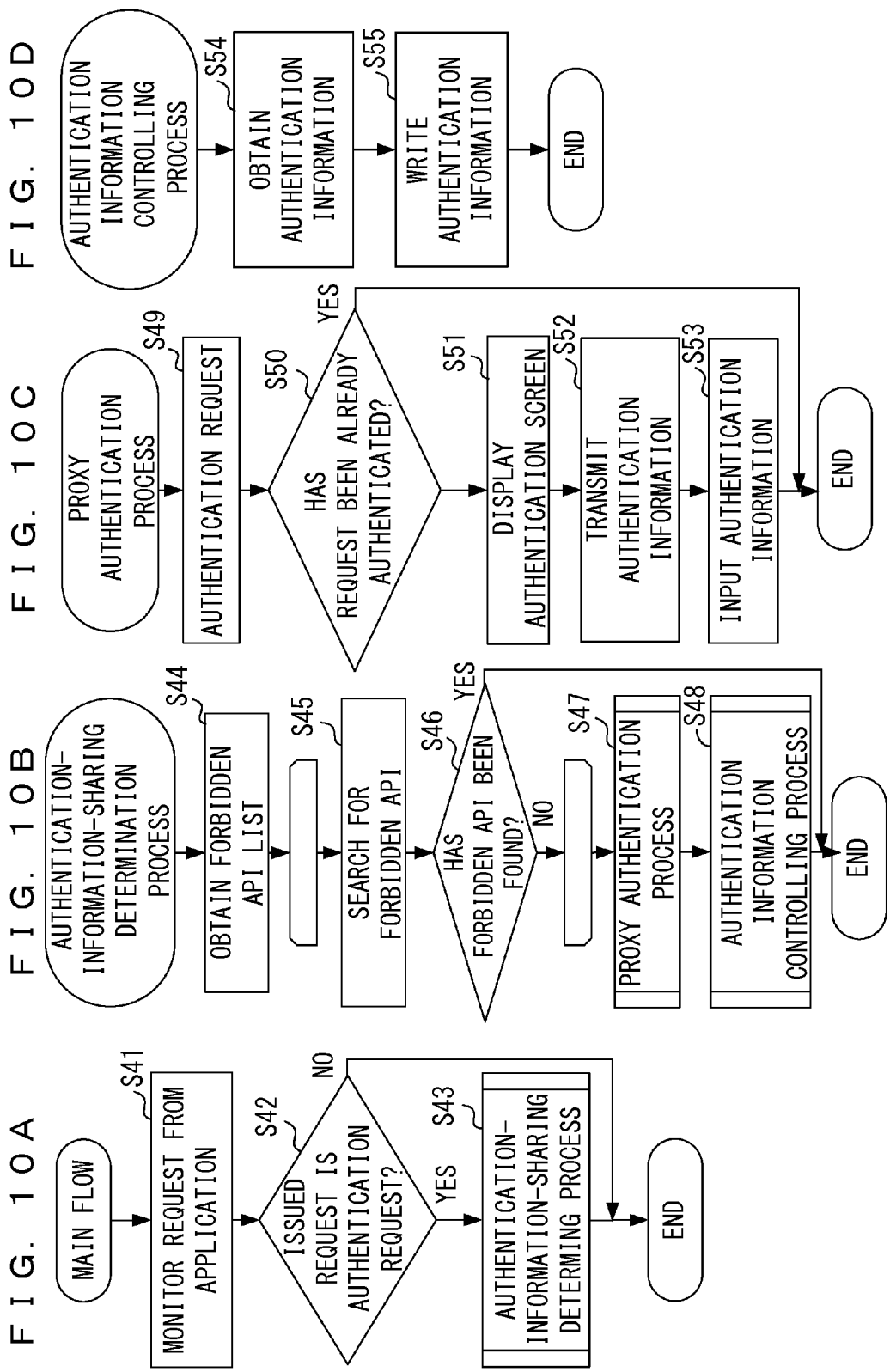
FIGS. 10A, 10B, 10C and 10D are flowcharts illustrating an exemplary authentication process in accordance with the third embodiment.

Next, an authentication process of the third embodiment will be described with reference to the flowchart of FIG. 10. As depicted in FIG. 10A, the authentication controlling unit 18 monitors requests from Web applications present within the browser region unit 3 (step S41).

When a Web application 21 makes a request, the authentication controlling unit 18 determines whether that request relates to authentication (step S42). When the authentication controlling unit 18 determines that the request does not relate to authentication (NO in step S42), the authentication controlling unit 18 terminates the process. Meanwhile, when the authentication controlling unit 18 decides that the request does relate to authentication (YES in step S42), the authentication controlling unit 18 performs an authentication-information-sharing determination process (step S43).

FIG. 10B depicts the authentication-information-sharing determination process of step S43. The authentication-information-sharing determination unit 31 obtains a forbidden API list from the forbidden-API-list holding unit 33 (step S44). The authentication-information-sharing determination unit 31 also searches for an API of the Web application 21 using information on the Web application 21 stored in the application storing unit 12 (step S45).

In one possible example, the application storing unit 12 stores the source code of the Web application 21. The authentication-information-sharing determination unit 31 decodes and reads the source code of the Web application 21 from the application storing unit 12. Then, the authentication-information-sharing determination unit 31 searches for an API included in the source code of the Web application 21.

The authentication-information-sharing determination unit 31 determines whether the source code of the Web application 21 includes a forbidden API included in the forbidden API list (step S46). The processes of steps S45 and S46 are performed for every API included in the source code of the Web application 21. That is, a loop process is performed as many times as the number of APIs included in the source code of the Web application 21.

When a forbidden API is not found by searching all of the APIs included in the source code of the Web application 21, the proxy authentication process is performed (step S47), and the authentication information controlling process is performed (step S48). Meanwhile, when a forbidden API is found within the source code of the Web application 21 (YES in step S46), the processes of steps S47 and S48 are not performed.

When a forbidden API is found in the Web application 21, it is preferable that the first authentication information storing unit 14 and the second authentication information storing unit 17 do not share authentication information. As an example, when the forbidden API is an API adapted to obtain a file with personal information, the Web application 21 is preferably prohibited from using the API.

Next, as a proxy for the Web application 21, the proxy authentication unit 16 makes a request for the authentication station Idp to perform authentication (step S49). The authentication station Idp determines whether the received authentication request has already been authenticated (step S50). When the authentication station Idp decides that the received authentication request has not been authenticated (NO in step S50), the authentication station Idp sends a report that indicates the authentication request has not been authenticated to the communication terminal 1.

When the report is received from the authentication station Idp indicating that the authentication request has not been authenticated, the proxy authentication unit 16 displays an authentication screen on the display input unit 4 (step S51). Using the authentication screen, the user inputs predetermined information to be used for authentication. The proxy authentication unit 16 controls the communication unit 11 to transmit authentication information to the authentication station Idp (step S52). The authentication station Idp performs authentication of the received authentication information.

The authentication station Idp transmits an authentication result to the communication terminal 1. The communication unit 11 receives and outputs the authentication result to the proxy authentication unit 16. Accordingly, the proxy authentication unit 16 inputs the authentication result (step S53).

When the authentication station Idp determines that the received authentication request has already been authenticated (YES in step S50), the processes of steps S51-S53 are not performed. Next, as depicted in FIG. 7D, the authentication controlling unit 18 obtains authentication information (step S54).

When it is determines in step S50 that the authentication request has not been authenticated, the authentication controlling unit 18 obtains authentication information from the proxy authentication unit 16. When the authentication request is determined to have been authenticated in step S50, the authentication information is stored in the first authentication information storing unit 14. Hence, in such a case, the authentication controlling unit 18 obtains the authentication information from the first authentication information storing unit 14.

The authentication controlling unit 19 writes the authentication information to the second authentication information storing unit 17 (step S55). Thus, when the communication terminal 1 transmits an already authenticated authentication request to the authentication station Idp, the user does not need to perform the authentication task again. This may facilitate the authentication task in using an application of the communication terminal.

When a forbidden API is found in the source code of the Web application 21 in step S46, the processes of steps S47 and S48 are not performed, and hence authentication information is not shared. This may lead to a high level of security.

The following will describe the flow of the entirety of the process with reference to the sequence diagram of FIG. 11. First, a Web application 21 makes a request to use of a service of the service provider A. The request is transmitted to the service provider A (step S151).

At the request from the Web application 21, the service provider A makes a request for the communication terminal 1 to perform authentication for the use of the service (step S152). The Web application 21 issues an authentication request for the authentication station Idp. The authentication controlling unit 18 of the browser managing unit 15 obtains the authentication request.

The browser managing unit 15 calls up the authentication controlling unit 18 (step S153). In the case of a "redirect" to the authentication station Idp, the authentication controlling unit 18 calls up the authentication-information-sharing determination unit 31 (step S154).

The authentication-information-sharing determination unit 31 performs a process of determining whether a Web application 21 stored in the application storing unit 12 includes a forbidden API (step S155).

When it is decided that the Web application 21 does not include a forbidden API, the authentication-information-sharing determination unit 31 determines to share authentication information. In such a case, the authentication-information-sharing determination unit 31 calls up the proxy authentication unit 16 (step S156). Meanwhile, when it is determined that the Web application 21 does include a forbidden API, the authentication-information-sharing determination unit 31 determines to not share authentication information. In such a case, the authentication-information-sharing determination unit 31 does not call up the proxy authentication unit 16.

To make a request for the authentication station Idp to perform authentication, the proxy authentication unit 16 controls the communication unit 11 to transmit the authentication request to the authentication station Idp. The authentication station Idp performs different processes in accordance with whether the received authentication request has been authenticated.

First, descriptions will be given of a situation in which the authentication station Idp has received an authentication request that has been authenticated. A process for "Idp authenticated" in FIG. 11 will be performed. As a proxy for the Web application 21, the proxy authentication unit 16 makes a request for the authentication station Idp to perform authentication (step S157).

The authentication station Idp checks whether the authentication request transmitted from the communication terminal 1 has already been authenticated. In the case of "Idp authenticated", the authentication station Idp determines that the authentication request transmitted from the communication terminal 1 has already been authenticated.

The authentication station Idp sends to the communication terminal 1 a response indicating that the authentication request transmitted from the communication terminal 1 has already been authenticated (step S158). In one possible example, the authentication station Idp transmits "http 302 redirect" to the communication terminal 1. The communication unit 11 receives and outputs the response to the proxy authentication unit 16. The proxy authentication unit 16 recognizes that the authentication request issued by the Web application 21 has already been authenticated.

Next, descriptions will be given of a situation in which the authentication station Idp has received an authentication request that has not been authenticated. As a proxy for the Web application 21, the proxy authentication unit 16 makes a request for the authentication station Idp to perform authentication (step S159). The authentication station Idp checks whether the authentication request transmitted from the communication terminal 1 has already been authenticated. In the case of "Idp authenticated", the authentication station Idp determines that the authentication request transmitted from the communication terminal 1 has not been authenticated.

The authentication station Idp sends to the communication terminal 1 a result indicating that the authentication request transmitted from the communication terminal 1 has not been authenticated (step S160). The proxy authentication unit 16 displays an authentication screen on the display input unit 4 (step S161). In one possible example, the user enters an ID and a password using the authentication screen.

The proxy authentication unit 16 defines the entered ID and password as authentication information and transmits this information to the authentication station Idp (step S162). The authentication station Idp performs authentication of the authentication information transmitted by the proxy authentication unit 16. Authentication succeeds when authentication information held by the authentication station Idp is identical with the authentication information transmitted by the proxy authentication unit 16; otherwise, authentication fails.

The authentication station Idp transmits the authentication result to the communication terminal 1 (step S163). In an embodiment, the authentication result is defined as an Idp authentication result. The proxy authentication unit outputs the Idp authentication result to the authentication-information-sharing determination unit 31 (step S164).

The authentication-information-sharing determination unit 31 outputs the Idp authentication result to the authentication controlling unit 18 (step S165). The authentication controlling unit 18 outputs the Idp authentication result to the browser managing unit 15 (step S166). The browser managing unit 15 outputs the authentication result to the Web application 21 that is to be executed on the browser.

In the case of performing the flow for "Idp not authenticated", the authentication information requested by the Web application 21 is not stored in the first authentication information storing unit 14. Hence, according to the Idp authentication result received from the authentication station Idp, the proxy authentication unit 16 writes authentication information to the second authentication information storing unit 17 (step S167).

Meanwhile, in the case of performing the flow for "Idp authenticated", the authentication information requested by the Web application 21 is stored in the first authentication information storing unit 14. Hence, the authentication controlling unit 18 reads the authentication information from the first authentication information storing unit 14 and writes this information to the second authentication information storing unit 17 (step S167).

The browser managing unit 15 makes a request for the authentication station Idp to exchange authentication information with the service provider A (step S168). The authentication station Idp transmits to the communication terminal 1 a response to the request to exchange authentication information (step S169).

The browser managing unit 15 transmits a request that the Web application 21 uses the service of the service provider A (step S170). The service provider A responds to the entry request for the Web application 21 (step S171).

The response made in step S171 includes the result of authentication of the service provider A. In FIG. 11, the response is indicated as "Response+(sp authentication result)". The browser managing unit 15 stores the result of authentication of the service provider A. Hence, successful authentication allows the Web application 21 to use the service provided by the service provider A.

The third embodiment may facilitate the authentication task in using an application of the communication terminal described with reference to the first embodiment, and may achieve a high security authentication. This may lead to both convenience for the user and high security.

<Hardware Configuration>

Figure 12:
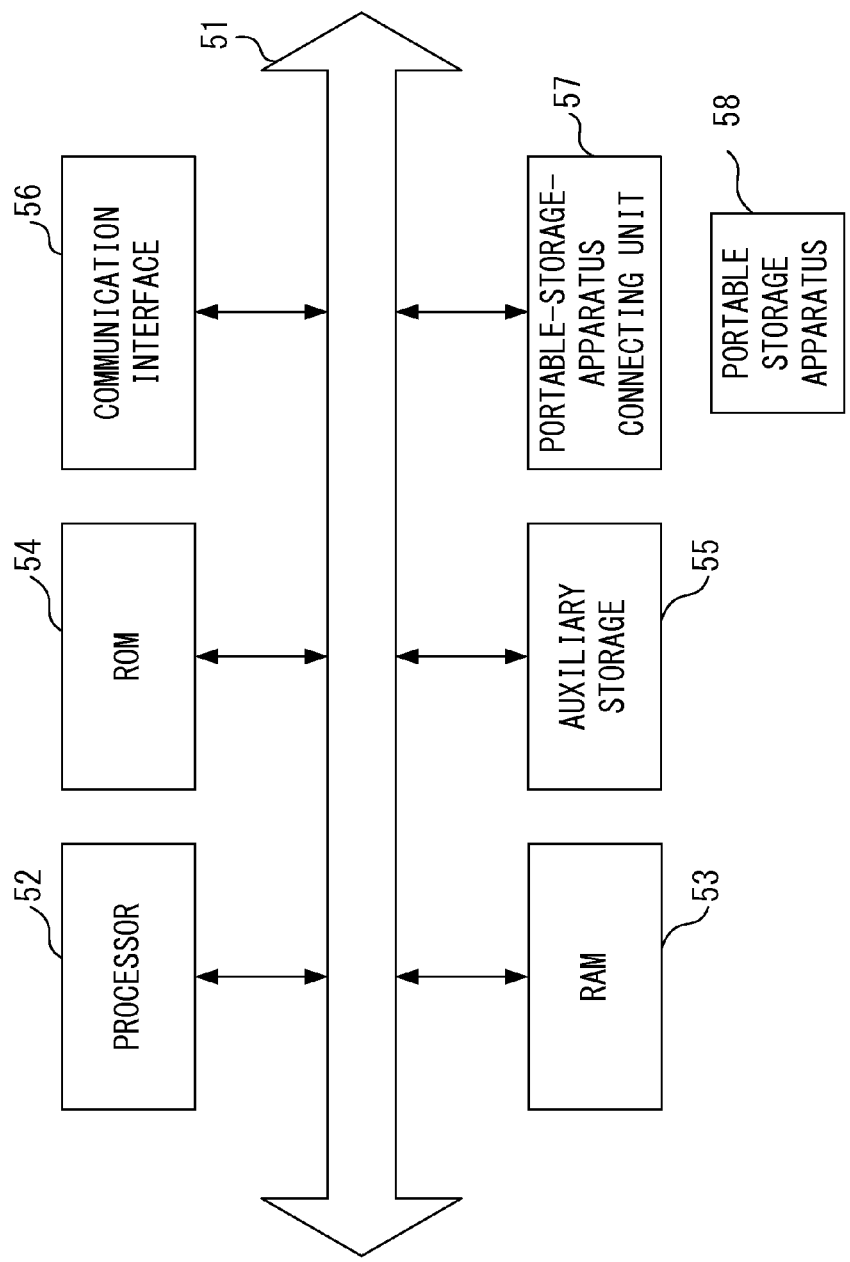
FIG. 12 illustrates an exemplary hardware configuration of a communication terminal.

The following will describe an exemplary hardware configuration of the communication terminal 1. As depicted in FIG. 12, the communication terminal 1 includes a processor 52, a Random Access Memory (RAM) 53, a Read Only Memory (ROM) 54, an auxiliary storage 55, a communication interface 56, and a portable-storage-apparatus connecting unit 57, all of which are connected to a bus 51.

The processor 52 is an arbitrary processing circuit such as a CPU (Central Processing Unit). The processor 52 executes a program mapped in the RAM 53. The ROM 54 is a nonvolatile storage apparatus that stores a program to be mapped in the RAM 53. The program mapped in the RAM 53 may be stored in the auxiliary storage 55. Examples of the storage apparatus include a semiconductor memory and a hard disk drive.

The portable-storage-apparatus connecting unit 57 is connectable to a portable storage apparatus 58. The portable storage apparatus 58 may be a portable memory or an optical disk (e.g., CD (Compact Disk) or DVD (Digital versatile Disk)). The portable storage apparatus 58 may store a program for achieving a process in accordance with an embodiment.

The RAM 53, the ROM 54, and the auxiliary storage 55 are all tangible computer-readable storage media. None of these tangible storage media is a transitory medium such as a signal carrier wave.

As an example, the communication unit 11 may be achieved by the communication interface 56. The local server 13, the proxy authentication unit 16, the authentication controlling unit 18, and the authentication-information-sharing determination unit 31 may be achieved by the processor 52. The application storing unit 12, the first authentication information storing unit 14, the second authentication information storing unit 17, the authorization list holding unit 32, and the forbidden-API-list holding unit 33 may be achieved by the RAM 53, the ROM 54, the auxiliary storage 55, or a portable storage apparatus connected to the portable-storage-apparatus connecting unit 57.

The embodiments may improve convenience in the authentication task in using an application of the communication terminal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication terminal comprising:
   a storage device having a first storage region and a second storage region; and
   a processor configured to execute a process when a Web application issues an authentication request, the process including
   receiving the authentication request,
   determining whether the Web application is authorized to use application authentication information and whether application authentication information, used by the Web application executed on a Web application execution environment of the communication terminal, is stored in the first storage region and is not stored in the second storage region, and
   when said determining is affirmative, writing first authentication information, managed by a native environment of the communication terminal and stored in the first storage region, to the second storage region as second authentication information,
   wherein the Web application applies the second authentication information in accessing a service.

2. The communication terminal according to claim 1, wherein, the processor performs proxy authentication of the application when the application issues a request related to authentication.

3. The communication terminal according to claim 1, wherein, the processor determines whether to write the first authentication information to the second storage region based on an authorization list indicating an application authorized to use the application authentication information.

4. The communication terminal according to claim 1, wherein, the processor determines whether to write the first authentication information to the second region based on a forbidden list indicating a function that is provided by an operating system of the communication terminal and that the application is forbidden from using.

5. The communication terminal according to claim 3, wherein
   the authorization list includes, for each application, information indicating whether to perform authentication again, and
   the processor performs authentication when the information indicates that authentication is to be performed again.

6. The communication terminal according to claim 2, wherein the processor performs the proxy authentication of the application under a region of the native environment.

7. A communication processing method, comprising:
   receiving, by a processor, an authentication request from a Web application executed on a Web application execution environment of a communication terminal;
   determining, by the processor in response to issuance of the authentication request by the Web application, whether the Web application is authorized to use application authentication information and whether the application authentication information used by the Web application is stored in a first storage region and is not stored in a second storage region;
   writing first authentication information, managed by a native environment of the communication terminal and stored in the first storage region, to the second storage region as second authentication information, when said determining is affirmative; and
   accessing a service by the Web application by reference to the second authentication information.

8. A non-transitory computer-readable recording medium having stored therein a program for causing a computer to execute a process comprising:
   receiving an authentication request from a Web application executed on a Web application execution environment of a communication terminal;
   determining, in response to issuance of the authentication request by the Web application, whether the Web application is authorized to use application authentication information and whether the application authentication information used by the Web application is stored in a first storage region and is not stored in a second storage region;
   writing first authentication information, managed by a native environment of the communication terminal and stored in the first storage region, to the second storage region as second authentication information, when said determining is affirmative; and
   accessing a service by the Web application by reference to the second authentication information.

\* \* \* \* \*